Feb. 10, 1953     E. H. SEHNERT     2,628,068
ELEVATING TRUCK
Filed July 12, 1949                                   2 SHEETS—SHEET 1
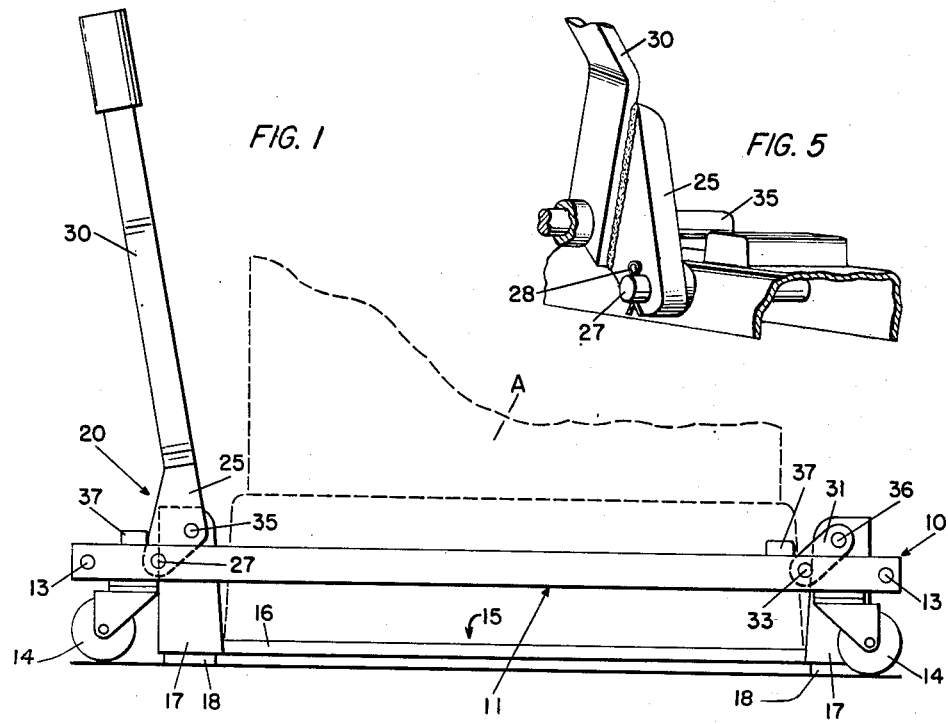
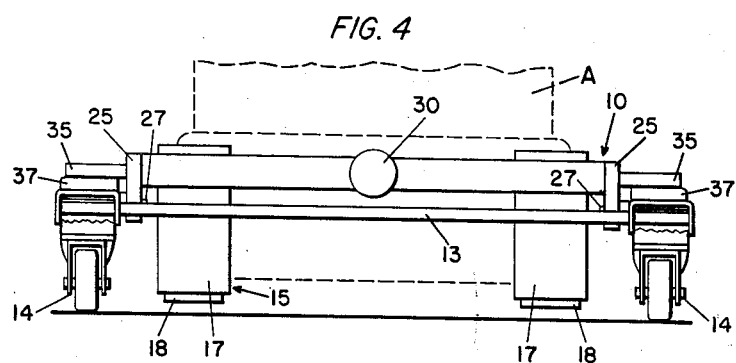
INVENTOR
Edward H. Sehnert
BY Hilmond O. Vogel
ATTORNEY Feb. 10, 1953          E. H. SEHNERT                 2,628,068
                       ELEVATING TRUCK
Filed July 12, 1949                              2 SHEETS—SHEET 2
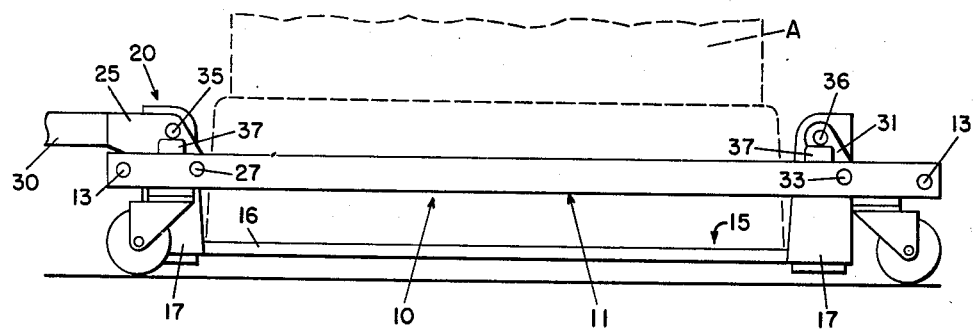
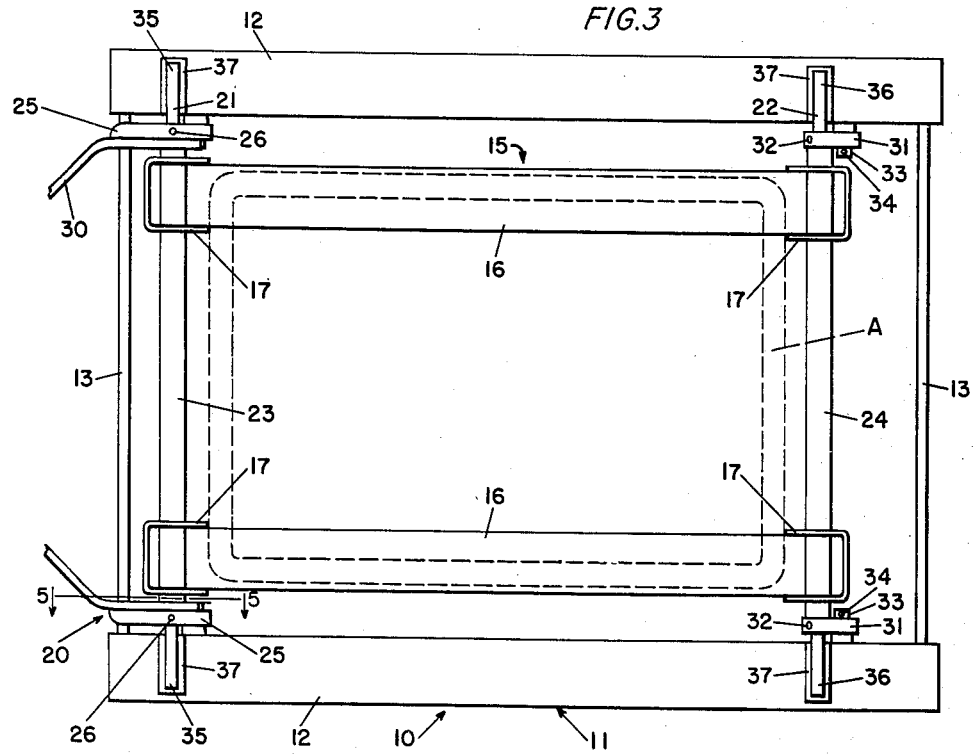
INVENTOR
Edward H. Sehnert
BY Hilmond O. Vogel
ATTORNEY Patented Feb. 10, 1953

2,628,068

UNITED STATES PATENT OFFICE 2,628,068

ELEVATING TRUCK

Edward H. Sehnert, Chicago, Ill.

Application July 12, 1949, Serial No. 104,190

1 Claim. (Cl. 254—10)

My invention relates to an elevating truck. More particularly it relates to an improved mechanism for raising the supporting platform of a truck from a ground supported position to a raised position wherein the platform is entirely supported on the truck.

The novel elevating truck with which the present invention is concerned may be used in many different applications where objects must be lifted and transported. The truck has however special features which readily adapt it to the use of positioning and transporting items such as power tools and equipment. In general power tools, of such character as used in the home, take considerable space in the small work shop and once they are placed in position they are very difficult to move into an out-of-the-way place. Applicant therefore has provided a novel elevating truck that is inexpensive to manufacture and which readily may be adapted for lifting a unit out of position and for transporting the same to a new location. In items such as power tools, it is extremely desirable that they are firmly seated on the floor or ground during operation. Yet it is desirable that they can quickly be lifted and removed from the location with a minimum of effort on the part of the operator. It is one of the primary objects of applicant's invention to provide an elevating truck which can securely position an object on the floor in an operating position and which can with great care be operated to lift the object onto a wheeled truck for subsequent transportation.

It is another object to provide an elevating truck having a platform which may be securely positioned on the floor or ground, the platform including a novel lifting arrangement for lifting the platform to a raised position on the truck.

A still further object is to provide a lifting mechanism for raising the platform of an elevating truck, the mechanism including a plurality of lifting links which are pivotally connected to the platform and to the main frame of the truck, the links being movable to an over center position to raise the platform and to lock the platform in its raised position.

Still another object is to provide an improved lifting linkage for raising the platform of an elevating truck, the platform including means engageable with the truck for supporting the platform on the truck independently of the lifting links.

Another object is to provide an improved truck or carrier for transporting equipment, the carrier including a lifting platform which is arranged to support the equipment on the floor or ground during operation, the platform being movable to a raised position whereupon the weight of the equipment is carried directly on the truck or carrier independently of the mechanism used in the lifting operation.

These and other objects will become more readily apparent from a reading of the specification when examined in connection with the accompanying drawings.

In the drawings:

Figure 1 is a side elevational view of an elevating truck or wheeled carrier, showing a lifting platform positioned on the floor for supporting an item of equipment.

Figure 2 is a view in elevation similar to Figure 1 showing the lifting platform of a carrier moved to a raised position.

Figure 3 is a plan view of the carrier showing a lifting platform in a raised position.

Figure 4 is a front view of the truck shown in the position indicated in Figures 2 and 3.

Figure 5 is a detail perspective view of a portion of a lifting lever and link showing its connection to the carrier, the view being substantially taken along the line 5—5 of Figure 3.

Referring particularly to Figures 1, 2 and 3, an elevating truck or carrier is generally designated by the reference character 10. The carrier or truck 10 includes a main frame generally designated at 11. The frame 11 includes a pair of laterally spaced frame members 12. The frame members 12 are connected at the forward and rearward ends by tie bars or braces 13 which may be secured by welding or other rigid securing means. The frame 11 is of rectangular shape and is provided at four corners with castering wheels 14 which permit the carrier to be readily moved from one location to another.

As best shown in Figures 2 and 3, a supporting or lifting platform 15 is positioned within the main frame 11. The lifting platform 15 includes a pair of longitudinally extending beams 16, which have connected at their ends, channel shaped bearing posts or supports 17. The bearing supports 17 are rigidly secured to the platform 15 and extend upwardly with respect thereto. The members 17 also include rubber feet or pads 18 for seating the platform 15 in its lowered position.

The platform is adapted to support equipment which may be in the form of a power tool or other object which is shown in the dotted line position in the figures and is designated A. The lifting platform may be moved from a ground supported position as shown in Figure 1, to a raised transport position as shown in Figure 2. A lifting mechanism 20 is provided to move the platform 15 from the lowered to the raised position.

The lifting mechanism 20 includes a pair of longitudinally spaced rotatable shafts 21 and 22. The shafts 21 and 22 are respectively journalled in bearing members 23 and 24. The bearing member 23 is tubular in construction and is supported on the front channel shaped bearing supports 17. The bearing supports 17 extend upwardly from the forward ends of the longitudinally extending beams 16. The bearing member 24 is also tubular in construction and is supported on the rear bearing supports 17. The connection of the bearing members 23 and 24 in cooperation with the bearing supports 17 securely connects the members 16 so that the platform is well braced to support the equipment A.

As best shown in Figures 1, 3, 4 and 5, a pair of lifting links 25 are connected to the shaft 21. As indicated at 26 in Figure 3, the links are pinned to the shaft 21 and thus are rotatable therewith. The links 25 extend substantially parallel with respect to each other and are pivotally connected to stub shafts 27 which project inwardly of the frame member 12. Cotter keys 28 may be utilized for securing the lifting links 25 to the stub shafts 27.

As best shown in Figures 4 and 5, a fork shaped lifting handle 30 is rigidly secured to the links 25 by welding. Movement of the links 25 is effected by actuation of the lifting handle 30.

A pair of rear parallel lifting links 31 are pinned to the shaft 22 as indicated at 32. The links 31 extend downwardly and are pivotally connected to stub shafts 33 which project inwardly from the frame members 12. The links 31 may be secured to the stub shafts 33 by conventional cotter keys 34.

As best shown in Figures 2, 3, 4 and 5 the shafts 21 and 22 are respectively provided with shaft extensions or portions 35 and 36 which overlap the frame members 12. The extensions 35 and 36 are adapted to be supported on resilient cushioning members 37 which are connected to the frame members 12.

*The operation*

A piece of equipment A is securely seated upon the platform 15. The platform 15 as shown in Figure 1 is in its down or lowered position. In this position the feet 18 are firmly seated on the floor and the entire weight of the equipment is supported by the floor independently of the main frame 11. In this position the equipment can be placed into operation with full assurance that it is firmly seated on the floor in a fixed position. The handle 30 is also in the up position.

After the operator has completed his work, he may desire to move the equipment to a new location. He thereupon rotates the handle 30 in a counter-clockwise direction. The lifting links 25 are thereupon also moved in a counter-clockwise direction with the shaft 21, the pivotal action taking place on the stub shafts 27. The platform 15 is thereupon moved in a forward longitudinal direction, also being raised at the same time. The force exerted in moving the platform 15 causes the links 31 also to rotate about the stub shafts 33 whereupon the rear of the platform is raised simultaneously with the front portion.

As best shown in Figures 2 and 3 the links are moved in a counter-clockwise direction to an over-center position, beyond the pivotal connection on the stub shafts. Thus the platform 15 is locked in its raised position and the equipment and carrier 10 may be readily moved to any desirable new location.

It is of prime importance to note that the extensions 35 and 36 have been moved to the overlapping position where they are supported on the cushions 37 of the longitudinal members 12. The entire weight of the equipment A therefore is supported on the frame 11 independently of the lifting links 25 and 31. A rigid and long enduring construction is thus provided.

In order to lower the equipment again to the floor the operator merely moves the handle in a clockwise direction from the position shown in Figure 2 to the position shown in Figure 1, and the equipment can again be securely fixed on the floor.

It can now be seen that a novel, practical and inexpensive carrier has been provided wherein equipment or articles can easily and quickly be transported from one location to another with a minimum of effort. The carrier is especially adaptable for shop equipment and machines wherein it is desirable that the machine is rigidly supported on the floor during use and where it is also desirable to move the unit after the operation has been completed. It is of course readily apparent that the carrier may be utilized for any number of different items to be transported.

It is believed that the invention has been concisely described and set forth. It must be understood however that changes and modifications may be made in the design without departing from the spirit of the invention, nor the scope thereof as defined in the appended claim.

I claim:

An elevating truck comprising a wheeled main frame having a pair of laterally spaced substantially parallel frame members, transversely extending braces connecting said frame members, a supporting platform positioned between said frame members, said supporting platform being movable from a ground supported position to a raised position, a lifting structure for moving said supporting platform, said structure including bearing members connected to the platform at longitudinally spaced portions thereof, said bearing members including tubular bearing elements extending transversely of the platform, shafts journalled on the bearing elements, each shaft including a projecting portion extending outwardly of the platform and adapted to overlap the spaced frame members, a plurality of lifting links connected to the shafts and arranged to pivot with respect to said platform, means pivotally connecting the links to the main frame, a lever connected to one of said shafts for moving the shaft and pivoting said links about their pivotal connections on the main frame, whereby said tubular bearing members and said shafts are moved to an over-center position with respect to the pivotal connections of said links, the projecting portions of the shaft being arranged and constructed to engage the frame members for supporting the supporting platform in a raised position.

EDWARD H. SEHNERT.

REFERENCES CITED

The following references are of record in the file of this patent:

UNITED STATES PATENTS

| Number | Name | Date |
|---|---|---|
| 827,966 | Flake | Aug. 7, 1906 |
| 1,125,634 | Barrett | Jan. 19, 1915 |
| 1,129,775 | Anthony | Feb. 23, 1915 |
| 2,080,332 | Palthe | May 11, 1937 |
| 2,230,014 | Raven | Jan. 28, 1941 |
| 2,271,071 | Haber | Jan. 27, 1942 |
| 2,511,073 | McCandless | June 13, 1950 |

FOREIGN PATENTS

| Number | Country | Date |
|---|---|---|
| 96,801 | Switzerland | Nov. 1, 1922 |
| 491,789 | Great Britain | Sept. 5, 1938 |